United States Patent
Zhang et al.

(10) Patent No.: US 11,165,053 B2
(45) Date of Patent: Nov. 2, 2021

(54) CONDUCTIVE-FLAKE STRENGTHENED, POLYMER STABILIZED ELECTRODE COMPOSITION AND METHOD OF PREPARING

(71) Applicant: ADVEN INDUSTRIES, INC., Edmonton (CA)

(72) Inventors: Xiaotian Zhang, Edmonton (CA); Xinwei Cui, Edmonton (CA); Bin Xie, Edmonton (CA); Weixing Chen, Edmonton (CA); Xiaojing Liu, Edmonton (CA)

(73) Assignee: ADVEN INDUSTRIES INC., Edmonton (CA)

( * ) Notice: Subject to any disclaimer, the term of this patent is extended or adjusted under 35 U.S.C. 154(b) by 340 days.

(21) Appl. No.: 16/345,470

(22) PCT Filed: Oct. 11, 2017

(86) PCT No.: PCT/CA2017/000221
§ 371 (c)(1),
(2) Date: Apr. 26, 2019

(87) PCT Pub. No.: WO2018/076098
PCT Pub. Date: May 3, 2018

(65) Prior Publication Data
US 2019/0280289 A1  Sep. 12, 2019

Related U.S. Application Data

(60) Provisional application No. 62/414,212, filed on Oct. 28, 2016.

(51) Int. Cl.
*H01M 4/36* (2006.01)
*H01G 11/24* (2013.01)
(Continued)

(52) U.S. Cl.
CPC ............. *H01M 4/362* (2013.01); *H01B 1/22* (2013.01); *H01B 1/24* (2013.01); *H01G 11/24* (2013.01);
(Continued)

(58) Field of Classification Search
CPC ...... H01M 4/362; H01M 4/13; H01M 4/0411; H01M 4/0435; H01M 4/139; H01M 4/622;
(Continued)

(56) References Cited

U.S. PATENT DOCUMENTS 3,864,124 A  2/1975  Breton et al.
4,194,040 A  3/1980  Breton et al.
(Continued)

FOREIGN PATENT DOCUMENTS

CA  2834780 A1  11/2012
EP  1091433 A1   4/2001
(Continued)

OTHER PUBLICATIONS

H.W. Rayson, G.C. McGrath and A.A. Collyer, Fibres, Whiskers and Flakes for Composite Applications, Department of Applied Physics, Sheffield City Polytechnic, Sheffield, UK, Chapter 2.

*Primary Examiner* — Gary D Harris
(74) *Attorney, Agent, or Firm* — Field LLP

(57) ABSTRACT

An electrode film with a high tensile strength and a low electrical resistance is fabricated by using conductive flakes to strengthen polymer stabilized particle electrode. The new compositions and low energy methods are disclosed in this invention. The method includes mixing and blending the particulate materials and fibrilltable polymers with conductive flakes into a paste, fibrillating the polymers, and extruding and rolling the paste into self-supported electrode films.

40 Claims, 2 Drawing Sheets

(51) Int. Cl.

| | | |
|---|---|---|
| *H01G 11/28* | (2013.01) | |
| *H01G 11/38* | (2013.01) | |
| *H01G 11/42* | (2013.01) | |
| *H01G 11/46* | (2013.01) | |
| *H01G 11/50* | (2013.01) | |
| *H01G 11/68* | (2013.01) | |
| *H01G 11/86* | (2013.01) | |
| *H01M 4/04* | (2006.01) | |
| *H01M 4/139* | (2010.01) | |
| *H01M 4/62* | (2006.01) | |
| *H01M 10/052* | (2010.01) | |
| *H01M 4/13* | (2010.01) | |
| *H01B 1/24* | (2006.01) | |
| *H01B 1/22* | (2006.01) | |
| *H01M 4/02* | (2006.01) | |
| *H01M 4/66* | (2006.01) | |
| *H01M 4/86* | (2006.01) | |
| *H01M 4/74* | (2006.01) | |

(52) U.S. Cl.
CPC ............ *H01G 11/28* (2013.01); *H01G 11/38* (2013.01); *H01G 11/42* (2013.01); *H01G 11/46* (2013.01); *H01G 11/50* (2013.01); *H01G 11/68* (2013.01); *H01G 11/86* (2013.01); *H01M 4/0411* (2013.01); *H01M 4/0435* (2013.01); *H01M 4/13* (2013.01); *H01M 4/139* (2013.01); *H01M 4/622* (2013.01); *H01M 4/625* (2013.01); *H01M 10/052* (2013.01); *H01M 4/623* (2013.01); *H01M 4/661* (2013.01); *H01M 4/74* (2013.01); *H01M 4/8668* (2013.01); *H01M 4/8673* (2013.01); *H01M 2004/021* (2013.01)

(58) Field of Classification Search
CPC .... H01M 4/625; H01M 10/052; H01M 4/661; H01M 4/8668; H01M 4/8673; H01M 4/74; H01M 4/623; H01M 2004/021; H01M 4/8864; H01B 1/24; H01B 1/22; H01G 11/24; H01G 11/28; H01G 11/38; H01G 11/42; H01G 11/46; H01G 11/50; H01G 11/68; H01G 11/86; Y02E 60/10; Y02E 60/50
USPC ........................................................ 429/217
See application file for complete search history.

(56) References Cited

U.S. PATENT DOCUMENTS

| | | | |
|---|---|---|---|
| 4,862,328 | A | 8/1989 | Morimoto et al. |
| 6,127,474 | A | 10/2000 | Andelman |
| 6,589,299 | B2 | 7/2003 | Missling et al. |
| 2005/0042513 | A1 | 2/2005 | Curran |
| 2015/0086901 | A1* | 3/2015 | Tatsuno ............. H01M 8/1007 429/481 |
| 2015/0118558 | A1* | 4/2015 | Yamazaki ............. H01M 4/133 429/220 |
| 2015/0372309 | A1 | 12/2015 | Yachi et al. |

FOREIGN PATENT DOCUMENTS

| | | |
|---|---|---|
| JP | 0257416 A | 2/1990 |
| JP | 091134 A | 1/1997 |
| JP | 09171823 A | 6/1997 |
| JP | 2000133267 A | 5/2000 |
| JP | 2012503699 A | 2/2012 |

\* cited by examiner

CONDUCTIVE-FLAKE STRENGTHENED, POLYMER STABILIZED ELECTRODE COMPOSITION AND METHOD OF PREPARING

FIELD

The present invention relates to compositions for strengthening polymer stabilized particle electrodes, and to low energy methods of manufacture such compositions and electrodes, particularly, in energy storage devices.

BACKGROUND OF THE INVENTION

Energy storage devices that are used to power modern technologies are numerous, including capacitors (e.g., electrical double-layer capacitors and lithium-ion capacitors), batteries (e.g., lithium-ion batteries and lithium-sulfur batteries), fuel cells, hydrogen storage devices, etc. Electrical double-layer capacitors (EDLCs), also referred to as ultracapacitors and super capacitors, are energy storage devices that are able to store more energy per unit volume and unit weight than conventional capacitors. Lithium-ion batteries have much higher energy density, but much less power density and shorter cycle life than EDLCs. Lithium-ion capacitors have a hybrid structure of EDLCs and lithium-ion batteries. Each type of devices is associated with a positive electrode and a negative electrode which can be made from the same or different active material. The compositions and methods of making such electrodes are crucial to the performance and the cost of the constructed devices for various applications.

The fabrication techniques of electrodes presently utilized commonly involve slurry-coating and/or paste-extrusion processes to produce an electrode film. Both processes combine binders, which typically comprise polymers or resins, with particles of the active material, and particles of a conductive material to form the electrode film. The binders provide cohesion within the resulting electrode films or between the electrode film and a current collector (typically Al foil or Cu foil) onto which the electrode film is applied.

In a slurry coating process, a liquid lubricant, typically organic, aqueous, or mixtures of aqueous and organic solvents, is used to dissolve binders within the resulting wet slurry of binder, active particles and conductive particles. The wet slurry is coated onto a current collector through a doctor blade or slot die, and the film is subsequently dried to evaporate and remove the solvent. However, such a slurry-coating electrode film has a rigid porous structure and is susceptible to cracking or particle spallation from the current collector. Thus, it is hardly used for a long period of time, and impairs the energy, power, cycle life and manufacturing consistency of the electrodes. In addition, as the electrode film thickness decreases, it becomes increasingly more difficult to achieve a homogeneous layer, resulting in a high-cost process, large capital investment, as well as high quality control. The slurry method of making electrode films is further not capable of producing a robust, self-supporting electrode film which is desirable for ease of application to the current collector and for strength.

In order to improve the resistance of the electrode to cracking and particle spallation, a paste-extrusion process has been adopted for the manufacture of self-supporting electrode films. In self-supporting films, active particles (for example, activated carbon particles in EDLCs) are held together into monoliths by a fibrillated polymer binder (typically, polytetrafluoroethylene (PTFE)). In prior art paste extrusion process of forming an extruded electrode film, a binder and active particles are blended together, either alone in dry form, or more typically in wet form, in the presence of a liquid lubricant and under shear conditions. The liquid lubricant may include hydrocarbons, antifoaming agents, surfactants, high boiling point solvents, dispersion aids, water, toluene, xylene, alcohols, glycols, ketones, naphtha, acetates, pyrrolidone, and Isopars™. The resulting material has dough-like properties that allow material to be introduced into an extruder apparatus in which the binder is fibrillated to form an extruded sheet. The extruded sheet may be calendered or rolled under heat and pressure many times to produce an electrode film before pressed onto a current collector to be an electrode.

In a paste-extrusion process, fibrillatable polymers, particularly fluoropolymers, such as PTFE, have been extensively used as particle stabilizing agents. The application of shear to the mixture of the fibrillatable polymer and active particles serves to fibrillate the fibrilatable polymers and forms an interconnecting spider web-like, self-supported film that holds particles together. The polymer stabilized electrode film is very flexible.

Once the film is attached to a current collector, the resultant electrode has high resistance to cracking and particle spallation. However, during the fabrication of the self-supported electrode film itself, although flexible, it is soft in nature and easily torn or broken before their attachment to the current collector. Therefore, it is desirable to increase the tensile strength of the electrode film in paste-extrusion electrode fabrication processes to ease manufacturing, processing, handling, and fabrication into other products In the prior art, sintering is used to strengthen the connection between PTFE and active particles. The sintered paste is subsequently stretched to be the electrode film (U.S. Pat. Nos. 4,194,040, 3,864,124 and 4,862,328). In another prior art, a second polymer is added into PTFE-active particle system to form a ternary system (U.S. Pat. No. 6,127,474). The second polymer forms stronger fibers, strengthening the original system without the necessity of sintering the primary particles themselves. In both cases, it requires sufficient heat to render the composition softenable and extrudable in the blending, extrusion and rolling processes. In addition, those second polymers are non-conductive materials. When adding a large amount, typically 7 wt. % or more of the second polymer, it significantly sacrifices the conductivity of the electrode films. Moreover, when pressing the second polymer under heat, the second polymer tends to form an extended film/cloth that blocks the surface of the active particles, and thus, partially deactivates the active particles, which sacrifices the performance of the whole electrode or device.

In the prior art, dry binder and dry active particles are blended and form a paste at elevated temperatures without addition of any processing lubricants (U.S. Pat. No. 7,295,423 B1). However, the process requires a precise control of temperature and a relatively high temperature and pressure during extrusion and hot rolling, leading to a rather complicated and high energy-consuming process.

Adding heat is normally to soften the polymer, and as such, to facilitate the fibrillation process (in extrusion and rolling steps). Hence, the temperature should be higher than the polymers' softening point. Depending on the type of polymer used, the temperature is different, normally ranging from 100° C. to 300° C. (U.S. Pat. Nos. 6,127,474 and 7,295,423 B1). In the method of sintering (U.S. Pat. Nos.

4,194,040, 3,864,124 and 4,862,328), the temperature used is even higher to melt the polymers, typically higher than 300° C.

In industry, it is hard to accurately control the temperature in the fibrillation process or in the extrusion and rolling processes, because the extruder or the roller is made of metals or alloys, and very easily dissipate heat. To counteract this, heated rollers are used, which are much more expensive than non-heated rollers.

Maintaining required high temperatures during rolling and extruding in atmospheric conditions leads to high energy consumption.

Therefore, there still exists in the art a need for improved compositions and methods of strengthening polymer stabilized active particle electrode films that show good conductivity using a paste-extrusion electrode fabrication process.

SUMMARY OF THE INVENTION

The present invention relates to new compositions and low energy-consuming methods of using conductive flakes to form stabilized particle electrode films using the paste-extrusion electrode fabrication process.

The present invention comprises (a) mixing and blending of conductive flakes with active particles, at least one fibrillatable polymer, and spherical conductive carbon particles to form a paste; (b) extruding said paste into an extruded product; (c) subjecting said extruded product to calenders or rollers to produce a self-supported electrode film. In a preferred embodiment, the process further involves the mixing and blending of conductive flakes with active particles, at least one fibrillatable polymer, and spherical conductive carbon particles in a liquid lubricant to form a paste before step (b).

The tensile strength of the electrode film is increased by at least 30% to 16 folds, depending on the flake dimension and the flake concentration. The strengthened film structure will make the electrode films easy to manufacture, process, handle, and fabricate into other products without the necessity of adding heat or with the least requirement of heat. The three-dimensional conductive matrix provided by the conductive flakes reduces electrical resistance by over 70%.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings.

Figure 1:
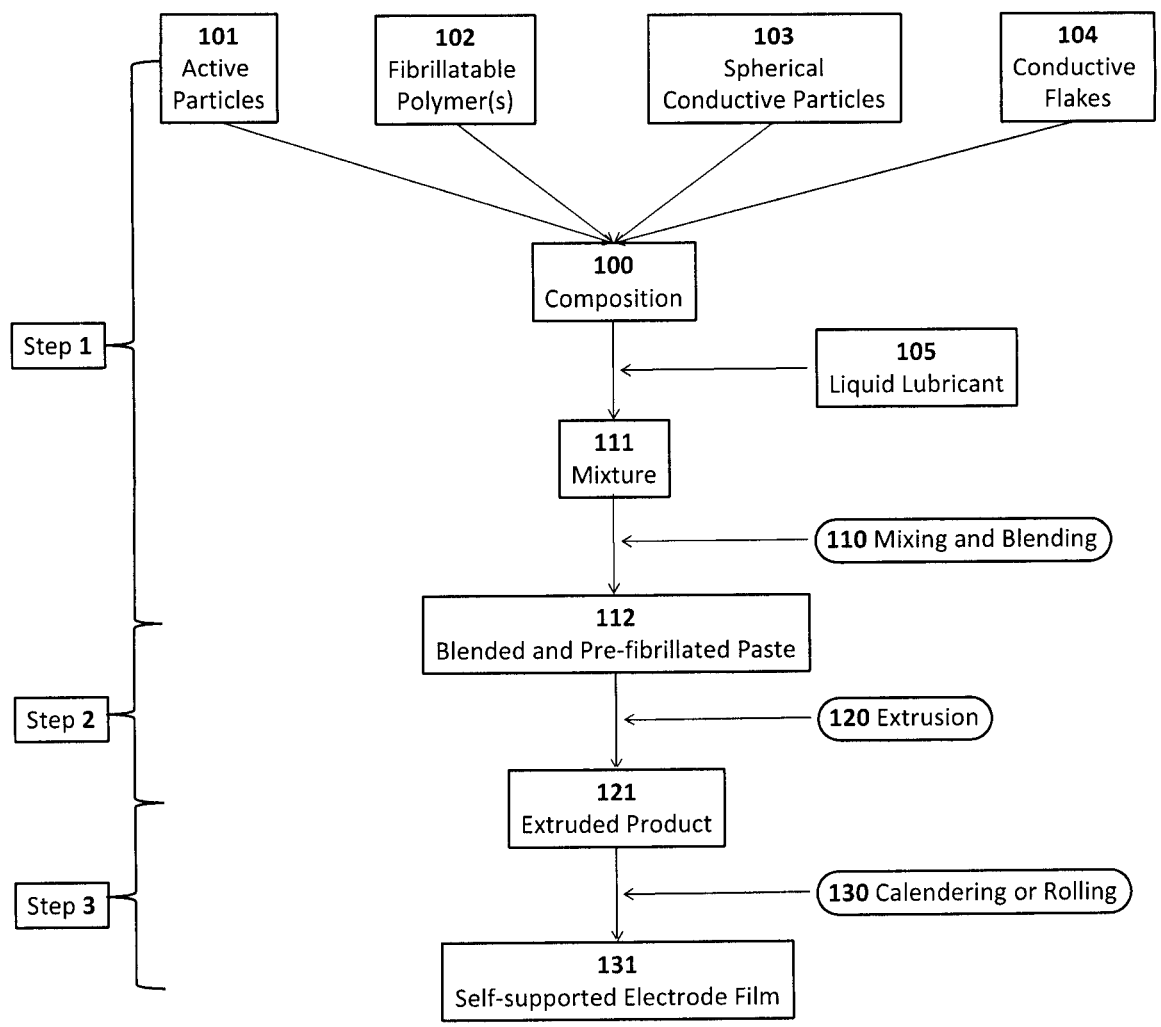
FIG. 1 is a flow process diagram of a method of the present invention for making polymer stabilized electrode films.

The drawing is not necessarily to scale and in some instances proportions may have been exaggerated in order more clearly to depict certain features.

DETAILED DESCRIPTION OF THE INVENTION

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

Definitions

As used herein an electrode film shall refer to a self-supported film extruded and pressed from a paste containing at least active particles and one or more binders without being attached to a current collector. As used herein the term a current collector refers to a highly conductive foil, for example, an Al, Cu, Ti, etc. foil used to conduct electrons from an electrode film. As used herein the term an electrode refers to a sheet of an electrode film attached onto a current collector. As used herein the term an active particle refers to an active material in the form of powders or particles that form the electrode. For example, in EDLCs, the active particles can be activated carbon particles. For another example, in lithium-sulfur batteries, the active particles can be sulfur-impregnated active carbon particles.

As used herein, the teiin fibrillatable polymer refers to any polymer that can be sheared into long fibres. Spherical conductive particles are considered to be those particles that add conductivity only to the electrode and are typically spherical particles.

Method of Making Conductive-Flake Strengthened, Polymer Stabilized Electrode Films The present invention relates to new compositions and low energy-consuming methods of using conductive flakes to strengthen polymer stabilized particle electrode films while forming a three-dimensional conductive matrix during the paste-extrusion electrode fabrication process.

The present compositions and methods have been seen to improve tensile strength of the electrode film by between 30% to 1600%, with minimal to no requirement for heating. The three-dimensional conductive matrix provided by the conductive flakes has been seen to reduce electrical resistance of the resultant electrode by over 70%.

One embodiment of a method of the present invention comprises (a) mixing and blending of conductive flakes with active particles, at least one fibrillatable polymer, and spherical conductive particles to form a paste; (b) extruding said paste into an extruded product; (c) subjecting said extruded product to calendars or rollers to produce a self-supported electrode film. In a preferred embodiment, the process further involves the mixing and blending of a liquid lubricant with the other components of step (a) to form a paste before step (b).

One embodiment of the paste-extrusion electrode fabrication process of the present invention is described in FIG.

1. In Step 1, the active particles 101, at least one type of fibrillatable polymer 102, and conductive particle 103 are mixed together with conductive flakes 104 to form a composition 100. In a preferred embodiment, a liquid lubricant 105 is added to the said composition 100 to form a mixture 111 to facilitate the mixing and blending process. The mixture 111 is mixed and blended 110 to form a pre-fibrillated paste 112.

Active particles 101 are active materials in the form of powders or particles. The concentration of the active particles in the said composition 100 is in the range from 60% to 99% in terms of weight percentage (wt. %), preferably, in the range from 80 wt. % to 90 wt. %. Active particles may have the particle size of between 1-50 microns, and preferably, in the range of between 5-20 microns. Suitable active particles 101 include, but not limited to, activated carbon particles, sulfur-impregnated activated carbon particles, lithium-oxygen containing compounds, stabilized lithium metal powders, metal oxide particles, metal sulfide particles, metal nitride particles and combinations thereof.

At least one fibrillatable polymer 102 is included in the said composition 100 in the amount from about 0.1 wt. % to 15 wt. %, and preferably, in the amount from 3 wt. % to 10 wt. %. The fibrillatable polymers are used as particle stabilizing agents that form a spider-web like matrix to hold the active 101 and conductive 103 particles together to form an electrode film after extrusion 120 and rolling 130. Fibrillatable polymers 102 may include, without limitations, polytetrafluoroethylene, polypropylene, polyethylene, co-polymers, various polymer blends, natural or synthetic rubbers, polyamide, polyurethane, liquid resins, silicon, elastomeric polymers, olefinic polymers and combinations thereof.

The spherical conductive particles 103 may have a particle size less than 1 micron, and typically, in the range from 0.01 micron to 0.1 micron. The submicron conductive particles 103 are preferably spherical carbon particles and can comprise, but are not limited to, carbon black particles, super P carbon particles, super C65 carbon particles; and combinations thereof. The concentration of the submicron spherical conductive particle in the said composition 100 can be in the range from 0.1 wt. % to 15 wt. %, and preferably, in the range from 1 wt. % to 10 wt. %.

Now referring to conductive flakes 104 in FIG. 1, the conductive flakes used in the present composition comprise metal flakes, preferably aluminum flakes, graphite flakes, graphene, expanded graphite flakes, conductive polymer flakes; and combinations thereof. The addition of 0.01 wt. % to 10 wt. %, and preferably, 0.1 wt. % to 5 wt. %, of the conductive flakes into the said composition 100 has been noted by the present inventors to surprisingly show significant increase of the tensile strength of the electrode film 131. As will be shown in Examples 1-9, similar compositions when made without the conductive flakes typically have a tensile strength around 0.03 kg/mm$^2$, while the present films with the conductive flakes have shown to possess a tensile strength greater than 0.04 kg/mm$^2$, and more frequently, from 0.05 kg/mm$^2$ to 0.5 kg/mm$^2$.

The increase of the tensile strength depends on the flake dimension. The conductive flakes used for the purposes of the present invention have the diameter in the range of 1-40 microns, with a preferred diameter range of 5-20 microns. The thickness of the conductive flakes is preferably in the range of less than 0.001 micron to 5 microns, with the most preferred thickness being less than 1 micron. As shown in Examples 1 and 4 described here below, increasing the diameter of the conductive flakes from 6 microns to 15 microns has been seen to increase the tensile strength of a 100 microns-thick electrode film by 80%. The shape of flakes, which are more preferably flat plates, facilitate and enhance the shearing of fibrillatable polymers microscopically during the extrusion 120 and rolling 130 processes. This results in a stronger polymer matrix than those without the addition of the conductive flakes. In addition, a coherent bond has been observed to form between the conductive flakes and polymer fibers, which in turn increases the strength of the whole matrix.

On the other hand, further increasing the diameter of the conductive flakes has been seen to reduce the tensile strength of the resultant electrode film, which is due to the reduced amount of conductive flakes included in the electrode film (Example 5). The increase of the tensile strength also depends on the flake concentration. As also shown in Examples 1 and 2, increasing the weight percentage of the conductive flakes from 2 wt. % to 5 wt. % increases the tensile strength of the electrode film.

The submicron spherical conductive particles 103 become attached to the fibrillated polymer fibers during extrusion 120 and rolling 130, and provide electrical conductivity along the fibrillating, or rolling, direction. However, since these conductive particles 103 are preferably spherical and small (submicron), the conductivity of the electrode film can be limited across the thickness of the film. The strong adhesion between micron-size conductive flakes and the fibrillated polymer fibers, advantageously, forms large conductive paths along the length of the film, and particularly, along the thickness of the electrode film, thereby forming a three-dimensional conductive matrix connecting conductive particles through the thickness of the film via the conductive flakes. This in turn reduces the electrical resistance of the resulting electrode film 131, and thus, the whole electrode. In Examples 10-11, the electrical resistance of 80 Farads electrical double-layer capacitors made from 150 microns-thick electrode films is reduced by over 70%, if 5 wt. % of conductive flakes is added in the composition.

Addition of the conductive flakes has also surprisingly shown improved strength of the self-supporting film. While some slurry methods of making lithium-ion batteries have used graphite flakes to improve conductivity, there has never been a need or requirement of the film strength in the slurry method.

The method of fabricating the composition 100 into an electrically conductive, self-supported electrode film 131 comprises mixing and blending 110 the ingredients of the composition 100, either alone in dry form, or more typically in wet form, in the presence of water or other liquid lubricant 105 and under shear conditions. The method also includes, thereafter, processing the blended and pre-fibrillated paste 112 into an electrode film 131 through an extruding process 120 and a calendering or rolling process 130 without the necessity of adding heat or with minimal heat addition. As illustrated in FIG. 1, in Step 2, the said pre-fibrillated paste 112 is extruded 120 to be an extruded product 121, preferably, in the form of an extruded sheet. In Step 3, the said extruded product 121 is calendered or rolled 130 multiple times to form a self-supported electrode film 131.

In a preferred embodiment, a liquid lubricant 105 is added to the said composition 100, to aid in pre-fibrillating during the blending 110 process, and to aid in fibrillating in the extrusion 120 and rolling 130 processes. The preferred liquid lubricant 105 of the present invention can comprise, but is not limited to, water, high boiling point solvents, antifoaming agents, dispersion aids, pyrrolidone mineral spirits, ketones, surfactants, naphtha, acetates, alcohols, glycols, toluene, acetone, chloroform, xylene, Isopars™, and combinations thereof.

In one preferred embodiment, the present composition 100 comprises 80 wt. % to 85 wt. % of 6-micron activated carbons 210 as the active particles, 5 wt. % to 10 wt. % of polytetrafluoethylene (PTFE) 220 as the fibrillatable polymer, 5 wt. % to 10 wt. % of super P carbon particle 230 as the spherical conductive particles, and 2 wt. % to 5 wt. % of graphite flakes 240 as the conductive flakes. Ethanol can be used as the preferred liquid lubricant. When fabricating the mixture 111 into electrode films, there is no requirement of adding heat during the blending 110, extrusion 120 or rolling processes 130, resulting in a simplified and low energy-consuming paste-extrusion electrode fabrication process.

Figure 2:
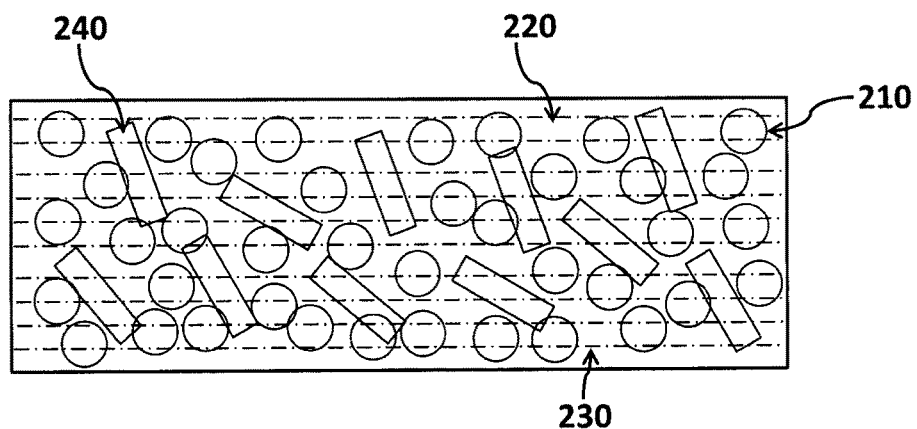
FIG. 2 is an enlarged diagrammatical plan view of a typical example of the structure of a preferred electrode film of the present invention.

It is desirable in the industry for the electrode film to have a tensile strength above 0.01 kg/mm$^2$, preferably, above 0.03 kg/mm$^2$ for the ease of processing or manufacturing the paste into electrodes. With the addition of conductive flakes 240 into the structure 201, as described in FIG. 2, the tensile strength of the present electrode films out of the present composition shows a tensile strength value of higher than 0.04 kg/mm$^2$, and in most experimental testing, over 0.09 kg/mm$^2$ (see Examples 1-7).

In another preferred embodiment, the composition comprises 80 wt. % to 85 wt. % of 6-micron activated carbons as the active particles 310, 3 wt. % to 5 wt. % of polytetrafluoethylene (PTFE) 320 and 2 wt. % to 3 wt. % of polyethylene 321 as the fibrillatable polymers, 5 wt. % to 10 wt. % of super P carbon particles 330 as the spherical conductive particles, and 2 wt. % to 5 wt. % of graphite flakes 340 as the conductive flakes. Toluene or acetone is used as the liquid lubricant 105. When fabricating this mixture 111 into electrode films, there is no requirement of adding heat during the blending 110, extrusion 120 or rolling 130 processes.

The present method therefore also represents comparatively low energy consumption than required for sintering or for adding other binders and heating. In most aspects of the present invention heat is not required and if heat is used it is limited to the blending step, which can be conducted in a closed environment such as in a sealed chamber, in which heating can be limited and controlled. This is in contrast to prior heating in the extrusion and rolling steps which required excess heat and provided limited heating control.

Figure 3:
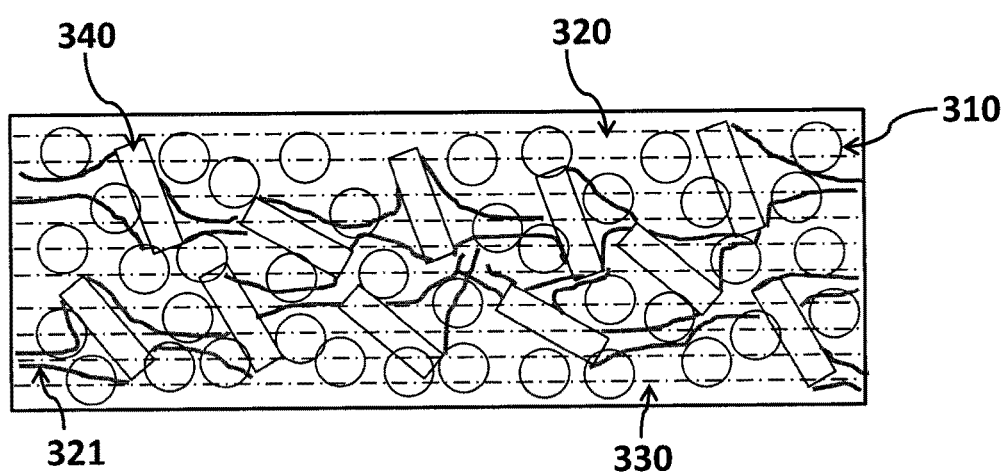
FIG. 3 is an enlarged diagrammatical plan view of a typical example of the structure of another preferred electrode film of the present invention.

However, in an alternate embodiment, adding a minimal amount of heat during extrusion 120 and rolling 130 processes may further increase the tensile strength, for example from 0.36 kg/mm$^2$ to 0.50 kg/mm$^2$ of the final structure 301 of the electrode films, as illustrated in FIG. 3 and described in Examples 8-9.

The present invention provides new compositions and low energy-consuming methods of using conductive flakes to strengthen polymer stabilized particle electrode while forming a three-dimensional conductive matrix during the paste-extrusion electrode fabrication process. The present invention limits the amount of heat and the second polymer used to achieve the required tensile strength, and meanwhile, preserve the performance of the whole electrode or device.

Referring again to FIG. 1, the blending process 110 is typically carried out in a blending machine capable of applying shear forces to the said mixture 111. Examples of the blending machines include, but not limited to, ball mill, jet mill, pin mill, impact pulverization, hammer mill, mechanical stirrer, crushers, and grinders.

The present invention may further comprise pressing a self-supported electrode film 131 onto a current collector to form an electrode for various applications. The current collector can comprise, but is not limited to, a metallic or alloy foil, such as aluminum foil, copper foil, titanium foil; a metal or ally mesh, such as aluminum mesh, copper mesh, titanium mesh; a conductive carbon cloth, an etched metal foil, and a coated metal foil. An etched current collector, such as an etched aluminum foil, may be used to increase the adherence of the electrode films 131 to the current collector. A thin layer of adhesive film may be coated onto the current collector to increase the coherence and reduce the interfacial resistance between the electrode film 131 and the current collector. The adhesive film can be the product sold under the trade name Electrodag® EEB-012 by Acheson Colloids Company, 1600 Washington Ave., Port Huron, Mich. 48060, Telephone 1-800-984-5581. The adhesive film can also be a carbon coating with the thickness less than 10 microns.

In addition to the application of the electrode films 131 in energy storage devices, these self-supported films 131, depending on the type of active particles included, can also be used in applications where faster absorption, desorption, or reaction kinetics are required or where better use of material and compactness are desire, such as gas filters, catalyst supporters, liquid separations, and water treatment.

EXAMPLES

The present invention will be described in further detail below through working examples.

Example 1

Activated Carbon Electrode Film:

The composition comprises 1) 80 wt. % of 6-micron activated carbons; 2) 10 wt. % of polytetrafluoethylene (PTFE); 3) 8 wt. % of super P carbon particle; 4) 2 wt. % of graphite flakes (6 microns in diameter).

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.05 kg/mm$^2$.

Example 2

Activated Carbon Electrode Film:

The composition comprises 1) 80 wt. % of 6-micron activated carbons; 2) 10 wt. % of polytetrafluoethylene (PTFE); 3) 5 wt. % of super P carbon particle; 4) 5 wt. % of graphite flakes (6 microns in diameter).

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.09 kg/mm$^2$.

Comparative Example 3

Activated Carbon Electrode Film:

The composition comprises 1) 80 wt. % of 6-micron activated carbons; 2) 10 wt. % of polytetrafluoethylene (PTFE); 3) 10 wt. % of super P carbon particle; and no conductive flakes.

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.03 kg/mm$^2$.

Example 4

Activated Carbon Electrode Film:

The composition comprises 1) 80 wt. % of 6-micron activated carbons; 2) 10 wt. % of polytetrafluoethylene (PTFE); 3) 8 wt. % of super P carbon particle; 4) 2 wt. % of graphite flakes (15 microns in diameter).

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.09 kg/mm$^2$.

Example 5

Activated Carbon Electrode Film:

The composition comprises 1) 80 wt. % of 6-micron activated carbons; 2) 10 wt. % of polytetrafluoethylene (PTFE); 3) 8 wt. % of super P carbon particle; 4) 2 wt. % of graphite flakes (50 microns in diameter).

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.04 kg/mm$^2$.

Example 6

Activated Carbon Electrode Film:

The composition comprises 1) 80 wt. % of 6-micron activated carbons; 2) 10 wt. % of polytetrafluoethylene (PTFE); 3) 6 wt. % of super P carbon particle; 4) 4 wt. % of graphene.

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.10 kg/mm$^2$.

Example 7

Activated Carbon Electrode Film:

The composition comprises 1) 80 wt. % of 6-micron activated carbons; 2) 8 wt. % of polytetrafluoethylene (PTFE); 3) 7 wt. % of super P carbon particle; 4) 5 wt. % of aluminum flakes (15 microns in diameter).

5 times total weight of the components 1)-4) of ethanol were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.12 kg/mm$^2$.

Example 8

Activated Carbon Electrode Film:

The composition comprises 1) 80 wt. % of 6-micron activated carbons; 2) 5 wt. % of polytetrafluoethylene (PTFE); 3) 3 wt. % of polyethylene; 4) 8 wt. % of super P carbon particle;

5) 4 wt. % of graphite flakes.

5 times total weight of the components 1)-5) of toluene were added into the composition as the liquid lubricant to form a mixture.

After the blending, the said mixture turns into a paste, which is then extruded and rolled into 100 microns thick, self-supported films at room temperature (without heat).

The obtained tensile strength of the electrode film is 0.36 kg/mm$^2$.

Example 9

Activated Carbon Electrode Film:

The composition comprises 1) 80 wt. % of 6-micron activated carbons; 2) 5 wt. % of polytetrafluoethylene (PTFE); 3) 3 wt. % of polypropylene; 4) 7 wt. % of super P carbon particle; 5) 5 wt. % of graphene.

5 times total weight of the components 1)-5) of acetone/ethanol were added into the composition as the liquid lubricant to form a mixture.

After the blending with minimal heat, the said mixture turns into a paste, which is then extruded and rolled into 100 microns thick, self-supported films.

The obtained tensile strength of the electrode film is 0.50 kg/mm$^2$.

Example 10

Activated Carbon Electrode:

The composition comprises 1) 80 wt. % of 6-micron activated carbons; 2) 10 wt. % of polytetrafluoethylene (PTFE); 3) 5 wt. % of super P carbon particle; 4) 5 wt. % of graphene.

5 times total weight of the components 1)-4) of ethanol were added into the composition as the liquid lubricant to form a mixture.

After the blending, the said mixture turns into a paste, which is then extruded and rolled into 150 microns thick, self-supported films at room temperature (without heat).

Said 150 microns-thick electrode films are pressed onto an adhesive film-coated Al foil (15 μm) to be an electrode.

80 Farads electrical double-layer capacitors (EDLCs) made from the above electrode.

The obtained electrical resistance of 80 Farads EDLCs is 7.5 mil.

Comparative Example 11

Activated Carbon Electrode:

The composition comprises 1) 80 wt. % of 6-micron activated carbons; 2) 10 wt. % of polytetrafluoethylene (PTFE); 3) 10 wt. % of super P carbon particle; and no conductive flakes.

5 times total weight of the components 1)-4) of ethanol were added into the composition as the liquid lubricant to form a mixture.

After the blending, the said mixture turns into a paste, which is then extruded and rolled into 150 microns thick, self-supported films at room temperature (without heat).

Said 150 microns-thick electrode films are pressed onto an adhesive film-coated Al foil (15 μm) to be an electrode. 80 Farads electrical double-layer capacitors (EDLCs) made from the above electrode.

The obtained electrical resistance of 80 Farads EDLCs is 25 mΩ.

Example 12

Sulfur-Impregnated Activated Carbon Electrode Film:

The composition comprises 1) 80 wt. % of sulfur-impregnated activated carbons; 2) 10 wt. % of polytetrafluoethylene (PTFE); 3) 7 wt. % of super P carbon particle; 5) 3 wt. % of graphite flakes.

5 times total weight of the components 1)-4) of water were added into the composition as the liquid lubricant to form a mixture.

After the blending, the said mixture turns into a paste, which is then extruded and rolled into 100 microns thick, self-supported films at room temperature (without heat).

The obtained tensile strength of the self-supported films is 0.10 kg/mm$^2$.

Said 100 microns-thick electrode films are pressed onto an adhesive film-coated Al foil (15 μm) to be a cathode in lithium-sulfur batteries.

The obtained cathode shows a high capacity of 1,236 mAh/g of sulfur with a high loading of over 5 mg-sulfur per cm$^2$.

What is claimed is:

1. A method of fabricating an electrode film suitable for use as an electrode, and said method comprising the steps of;
   (a) blending a composition comprising:
      (i) greater than 60 percent by weight of active particles;
      (ii) up to 15 percent by weight of at least one fibrillatable polymer binder;
      (iii) up to 15 percent by weight of spherical conductive particles; and
      (iv) up to 10 percent by weight of conductive flakes, to form a pre-fibrillated paste;
   (b) extruding said paste into an extruded product; and
   (c) rolling said extruded product to produce an electrode film,
wherein extruding and rolling serve to fibrillate the fibrillatable polymer binder.

2. The method of claim 1 wherein the active particles are selected from a group consisting of activated carbon particles, sulfur-impregnated activated carbon particles, lithium-oxygen containing compounds, stabilized lithium metal powders, metal oxide particles, metal sulfide particles, metal nitride particles and combinations thereof.

3. The method of claim 1 wherein the particle size of said active particles ranges from 1-50 microns.

4. The method of claim 1 wherein the fibrillatable polymers are selected from the group consisting of polytetrafluoroethylene, polypropylene, polyethylene, co-polymers, various polymer blends, natural or synthetic rubbers, polyamide, polyurethane, liquid resins, silicon, elastomeric polymers, olefinic polymers and combinations thereof.

5. The method of claim 1 wherein said conductive particles are spherical conductive particles.

6. The method of claim 5 wherein the spherical conductive particles are selected from the group consisting of carbon black particles, super P carbon particles, super C65 carbon particles and combinations thereof.

7. The method of claim 6 wherein the spherical conductive particles have a particle size less than 1 micron.

8. The method of claim 1 wherein the conductive flakes are selected from a group consisting of metal flakes, preferably, aluminum flakes, graphite flakes, graphene, expanded graphite flakes, conductive polymer flakes and combinations thereof.

9. The method of claim 8 wherein the conductive flakes have the diameter in the range of 1-40 microns.

10. The method of claim 8 wherein the thickness of said conductive flakes is in the range of 0.001 micron to 5 microns.

11. The method of claim 1 further comprising adding a liquid lubricant to said composition.

12. The method of claim 11 wherein the liquid lubricant is added at a proportion of up to 5 times the weight of the other components in the composition.

13. The method of claim 12 wherein the liquid lubricant is selected from the group consisting of water, high boiling point solvents, antifoaming agents, dispersion aids, pyrrolidone mineral spirits, ketones, surfactants, naphtha, acetates, alcohols, glycols, toluene, acetone, chloroform, xylene, Isopars™ and combinations thereof.

14. The method of claim 1 wherein the step of blending is carried out in a blending machine capable of applying shear forces to the said composition.

15. The method of claim 1 wherein the steps of extruding and rolling of the fibrillated composition are carried out at room temperature.

16. The method of claim 1 wherein the steps of extruding and rolling the fibrillated composition is carried out at a temperature and pressure equivalent to the softening point of said fibrillatable polymers.

17. The method of claim 1 wherein the electrode film has a tensile strength higher than 0.04 kg/mm$^2$.

18. The method of claim 1 further comprising a step of pressing the said electrode film onto a current collector to form an electrode used in energy storage devices.

19. The method of claim 18 wherein the current collector is selected from the group consisting of a metal foil, an alloy foil, a metal mesh, an alloy mesh, a conductive carbon cloth, an etched metal foil and a coated metal foil.

20. The method of claim 19 wherein the metal foil, alloy foil, metal mesh, alloy mesh and etched metal foil are comprised of metals selected from the group consisting of aluminum, copper, and titanium.

21. The method of claim 19 wherein a coated metal foil is selected from the group consisting of a carbon-coated metal foil and an adhesive film-coated metal foil.

22. The method of claim 1 wherein the device is selected from the group consisting of energy storage devices, filters and catalyst supporters.

23. The method of claim 18 wherein the energy storage devices are selected from the group consisting of electrical double-layer capacitors, lithium-sulfur batteries, lithium-ion batteries, lithium-ion capacitors, fuel cells, and hydrogen storage devices.

24. An electrode film suitable for use as an electrode, and said electrode film comprising:
   (a) greater than 60 percent by weight of active particles;
   (b) up to 15 percent by weight of at least one fibrillatable polymer binder;

(c) up to 15 percent by weight of spherical conductive particles; and (d) up to 10 percent by weight of conductive flakes.

25. The electrode film of claim 24 wherein the active particles are selected from a group consisting of activated carbon particles, sulfur-impregnated activated carbon particles, lithium-oxygen containing compounds, stabilized lithium metal powders, metal oxide particles, metal sulfide particles, metal nitride particles and combinations thereof.

26. The electrode film of claim 24 wherein the particle size of said active particles ranges from 1-50 microns.

27. The electrode film of claim 24 wherein the fibrillatable polymers are selected from the group consisting of polytetrafluoroethylene, polypropylene, polyethylene, co-polymers, various polymer blends, natural or synthetic rubbers, polyamide, polyurethane, liquid resins, silicon, elastomeric polymers, olefinic polymers and combinations thereof.

28. The electrode film of claim 24 wherein said conductive particles are spherical conductive particles.

29. The electrode film of claim 28 wherein the spherical conductive particles are selected from the group consisting of carbon black particles, super P carbon particles, super C65 carbon particles and combinations thereof.

30. The electrode film of claim 29 wherein the spherical conductive particles have a particle size less than 1 micron.

31. The electrode film of claim 24 wherein the conductive flakes are selected from a group consisting of metal flakes, preferably, aluminum flakes, graphite flakes, graphene, expanded graphite flakes, conductive polymer flakes and combinations thereof.

32. The electrode film of claim 31 wherein the conductive flakes have the diameter in the range of 1-40 microns.

33. The electrode film of claim 32 wherein the thickness of said conductive flakes is in the range of 0.001 micron to 5 microns.

34. The electrode film of claim 24 wherein the electrode film has a tensile strength higher than 0.04 kg/mm$^2$.

35. The electrode film of claim 24 wherein said electrode film is pressed onto a current collector to form an electrode used in energy storage devices.

36. The electrode film of claim 35 wherein the current collector is selected from the group consisting of a metal foil, an alloy foil, a metal mesh, an alloy mesh, a conductive carbon cloth, an etched metal foil and a coated metal foil.

37. The electrode film of claim 36 wherein the metal foil, alloy foil, metal mesh, alloy mesh and etched metal foil are comprised of metals selected from the group consisting of aluminum, copper, and titanium.

38. The electrode film of claim 36 wherein a coated metal foil is selected from the group consisting of a carbon-coated metal foil and an adhesive film-coated metal foil.

39. The electrode film of claim 24 wherein the device is selected from the group consisting of energy storage devices, filters and catalyst supporters.

40. The electrode film of claim 35 wherein the energy storage devices are selected from the group consisting of electrical double-layer capacitors, lithium-sulfur batteries, lithium-ion batteries, lithium-ion capacitors, fuel cells, and hydrogen storage devices.

\* \* \* \* \*